F. A. GUTHRIE.
Improvement in Folding-Frames for Tents.
No. 128,542. Patented July 2, 1872.

Witnesses:
John Becker.
Geo. W. Mabee

Inventor:
F. A. Guthrie
per
Attorneys.

F. A. GUTHRIE.
Improvement in Folding-Frames for Tents.
No. 128,542. Patented July 2, 1872.

128,542

UNITED STATES PATENT OFFICE.

FRANKLIN A. GUTHRIE, OF ADDISON, OHIO.

IMPROVEMENT IN FOLDING FRAMES FOR TENTS.

Specification forming part of Letters Patent No. 128,542, dated July 2, 1872.

Specification describing a new and useful Improvement in Tent-Frame and Sleeping-Berths, invented by FRANKLIN A. GUTHRIE, of Addison, in the county of Gallia and State of Ohio.

Figure 1:
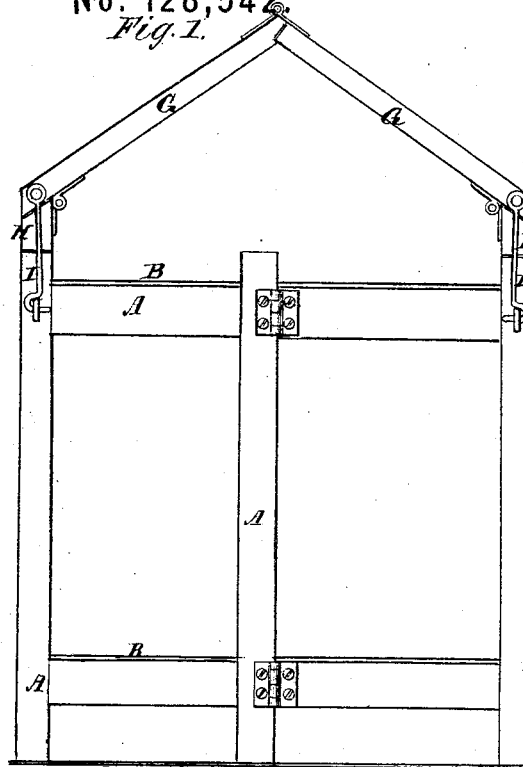
Figure 2:
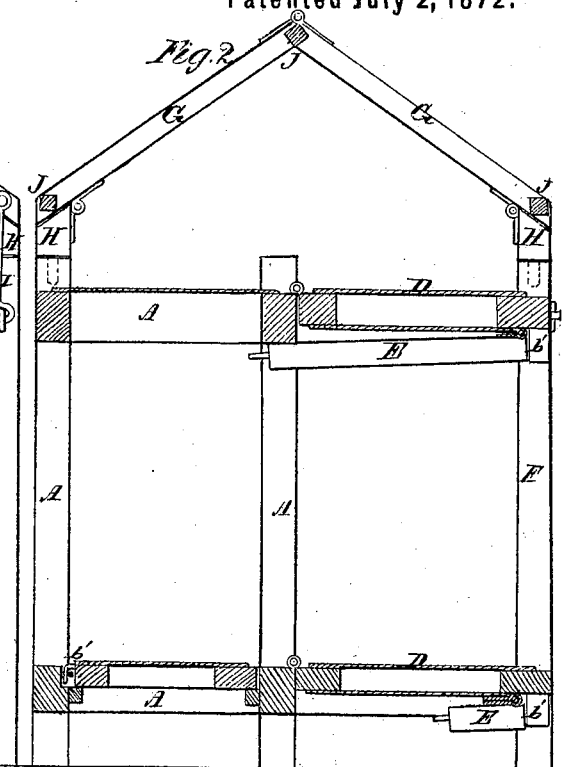
Figure 3:
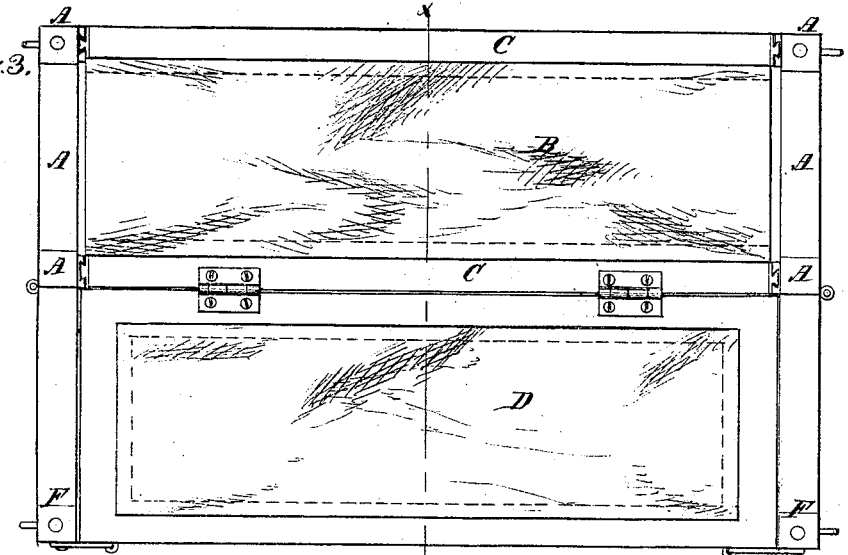
Figure 4:
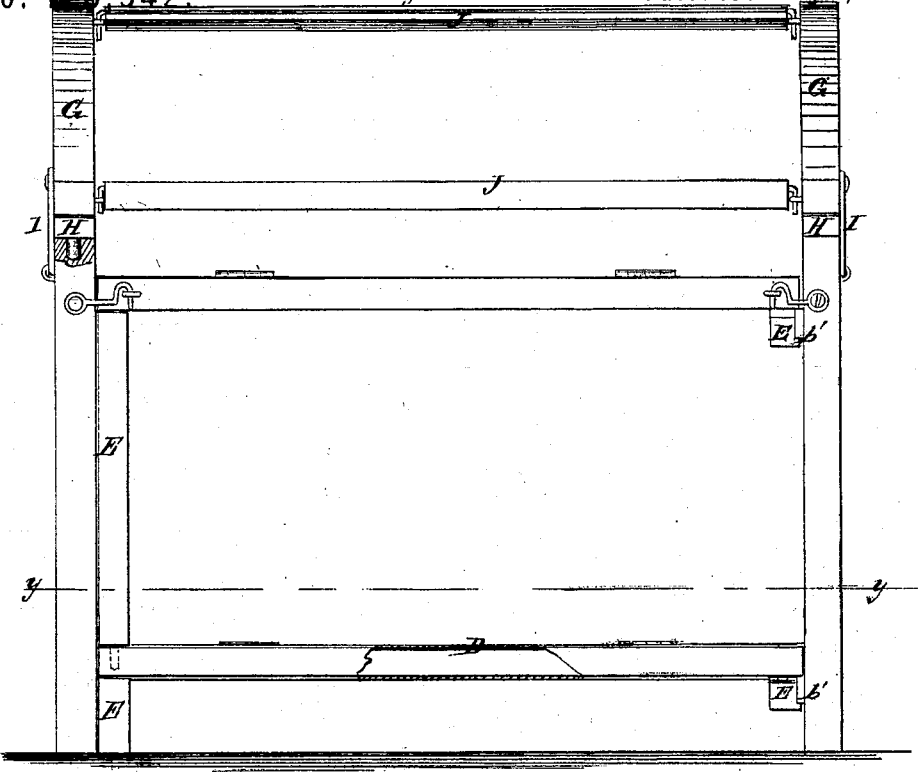
Figure 5:
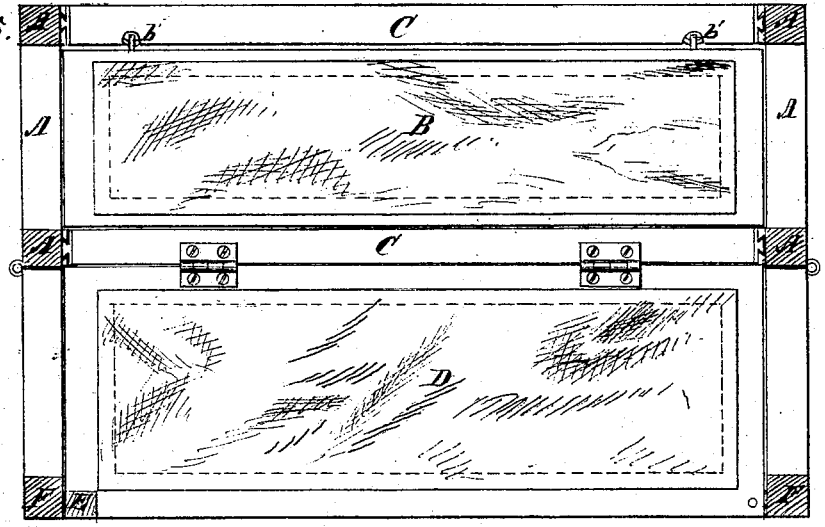

Figure 1, Sheet 1, is an end view of my improved tent-frame and sleeping-berths. Fig. 2, Sheet 1, is a vertical cross-section of the same taken through the line $x\ x$, Fig. 3. Fig. 3, Sheet 1, is a top view of the same, the rafters being removed. Fig. 4, Sheet 2, is a side view of the same. Fig. 5, Sheet 2, is a horizontal section of the same taken through the line $y\ y$, Fig. 4.

Similar letters of reference indicate corresponding parts.

My invention has for its object to furnish an improved folding tent-frame and sleeping-berths, which shall be simple and strong in construction, light, and capable of being folded in a small compass, so that it may be conveniently transported from place to place; and it consists in the construction and combination of various parts, as hereinafter more fully described.

A are the end frames of the main berths B, which are connected by detachable rails C. The rails C are connected with the frames A by dovetailed slides or couplings, somewhat in the manner in which the side rails of a bedstead are connected with their posts. Any desired number of the main berths B may be placed one above the other, and the lower berth or berths B should be hinged to the front rails C by hooks and staples or eyes, as shown at $b'$ in Figs. 2 and 5, so that the said lower berth or berths can be conveniently turned up and fastened, or detached so as to be out of the way to make the space available as a tent. To the central rails C are hinged the side berths D, so that when not in use they may be turned up in a vertical position and fastened or turned over upon the main berths B, and there used as berths, both sides of said berths D being made so that they can be slept upon to adapt them for this adjustment, as shown in Figs. 2 and 4. To each of the side berths D are hinged short legs E, the lower ends of the short legs E of the lowest berth D resting upon the ground or floor, and the lower ends of each leg E of each upper berth D resting upon the upper ends of the legs E, or upon the frame of the next lower berth D, the lower ends of said upper legs E being made with tenons to enter holes or mortises in their supports to keep them securely in place. To the rear sides of the rear posts of the end frames A are hinged the ends of the cross-bars or girths of the posts F, which hinges should be so formed that the said posts F may be turned back along the outer sides of said frames A, or detached from said frames, as may be desired. If desired, cleats $f'$ may be attached to the inner sides of the posts F to support the side berths D. G are the rafters, which are hinged to each other at their upper ends in pairs, as shown in Figs. 1 and 2, so that they may be folded back upon each other. To the lower ends of the rafters G are hinged short posts H, which have tenons formed upon their lower ends to enter mortises in the upper ends of the posts A F to keep them in place. The short posts H may be further secured in place upon the posts A F by hooks and staples I, or other convenient fastenings. The ends of the rafters G and short posts H that come in contact with each other are so formed that the said parts may brace each other. The rafters G are connected with each other by the poles J, over which the tent-cloth is spread. The poles J have hooks attached to their ends, which hook into eyes or staples attached to the rafters G, so that the said poles may be conveniently detached when desired.

When used expressly for tent purposes, the short posts H, attached to the rafters G, may be made in one piece with the posts of the frame, so that the bar or girth hinged to the main posts can be dispensed with, and so that when all the berths are removed a firm, solid frame will remain.

Having thus described my invention, I claim as new and desire to secure by Letters Patent—

1. The combination of the hinged side berths D with the main berths B, detachable rails C, and end frames A, substantially as herein shown and described, and for the purpose set forth.

2. The combination of the hinged legs E, constructed as described, with the side berths D hinged to the side rail C of the main berths D, substantially as and for the purposes set forth.

3. The combination of the hinged posts F with the end frames A, and side berths D hinged to the rails C of the main berths B, substantially as herein shown and described, and for the purpose set forth.

4. The hinged rafters G and short hinged posts H, in combination with each other and with the hinged posts F and the front posts of the end frames A, substantially as herein shown and described, and for the purpose set forth.

5. The combination of the detachable poles J with the hinged rafters G and short hinged posts H, substantially as herein shown and described, and for the purpose set forth.

FRANKLIN AUGUSTUS GUTHRIE.

Witnesses:
   SAML. A. NASH,
   J. G. DAMRON.